(12) United States Patent
Liu et al.

(10) Patent No.: US 10,259,936 B2
(45) Date of Patent: *Apr. 16, 2019

(54) 3-D PRINTED FLUOROPOLYMER STRUCTURES

(71) Applicant: Arkema Inc., King of Prussia, PA (US)

(72) Inventors: David Shin-Ren Liu, Bala Cynwyd, PA (US); Gregory S. O'Brien, Downingtown, PA (US); David A. Seiler, Garnet Valley, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,186

(22) Filed: Apr. 19, 2018

(65) Prior Publication Data

US 2018/0237627 A1    Aug. 23, 2018

Related U.S. Application Data

(63) Continuation of application No. 15/635,525, filed as application No. PCT/US2017/025357 on Mar. 31, 2017.

(Continued)

(51) Int. Cl.
*C08L 27/16* (2006.01)
*B33Y 10/00* (2015.01)
(Continued)

(52) U.S. Cl.
CPC ............ *C08L 27/16* (2013.01); *B29C 64/112* (2017.08); *B29C 64/118* (2017.08); *B33Y 10/00* (2014.12); *B33Y 70/00* (2014.12); *C08F 14/22* (2013.01); *C08K 3/04* (2013.01); *C08K 3/041* (2017.05); *C08K 3/042* (2017.05); *C08K 3/26* (2013.01); *C08K 3/30* (2013.01); *C08K 3/34* (2013.01);
(Continued)

(58) Field of Classification Search
CPC ................................ B33Y 10/00; B33Y 70/00
See application file for complete search history.

(56) References Cited

U.S. PATENT DOCUMENTS 8,801,990 B2    8/2014 Mikulak et al.
8,920,697 B2   12/2014 Mikulak et al.
(Continued)

FOREIGN PATENT DOCUMENTS

WO    WO-2015133315 A1 * 9/2015 ............ C08L 23/04

*Primary Examiner* — Betelhem Shewareged
(74) *Attorney, Agent, or Firm* — Thomas F. Roland

(57) ABSTRACT

The invention relates to fluoropolymer filament for use in 3-D printing, and 3-D printed fluoropolymer articles having low warpage, excellent chemical resistance, excellent water resistance, flame resistance, and good mechanical integrity. Additionally, the articles of the invention have good shelf life without the need for special packaging. In particular, the invention relates to filament, 3-D printed polyvinylidene fluoride (PVDF) articles, and in particular material extrusion 3-D printing. The articles may be formed from PVDF homopolymers, copolymers, such as KYNAR® resins from Arkema, as well as polymer blends with appropriately defined low shear melt viscosity. The PVDF may optionally be a filled PVDF formulation. The physical properties of the 3-D printed articles can be maximized and warpage minimized by optimizing processing parameters.

11 Claims, 3 Drawing Sheets

Picture of gears printed. Left is PVDF 5, mid is PVDF 1 and right is PVDF 2.

Related U.S. Application Data

(60) Provisional application No. 62/320,649, filed on Apr. 11, 2016, provisional application No. 62/316,687, filed on Apr. 1, 2016.

(51) Int. Cl.
| | |
|---|---|
| *B33Y 70/00* | (2015.01) |
| *C08K 3/04* | (2006.01) |
| *B29C 64/118* | (2017.01) |
| *C08F 14/22* | (2006.01) |
| *C08K 3/26* | (2006.01) |
| *C08K 3/30* | (2006.01) |
| *C08K 3/34* | (2006.01) |
| *C08K 3/36* | (2006.01) |
| *C08K 3/40* | (2006.01) |
| *C08K 7/06* | (2006.01) |
| *C08K 7/14* | (2006.01) |
| *C08K 7/22* | (2006.01) |
| *B29C 64/112* | (2017.01) |
| *B33Y 80/00* | (2015.01) |
| *B29K 27/00* | (2006.01) |

(52) U.S. Cl.
CPC ............... *C08K 3/36* (2013.01); *C08K 3/40* (2013.01); *C08K 7/06* (2013.01); *C08K 7/14* (2013.01); *C08K 7/22* (2013.01); *B29K 2027/16* (2013.01); *B33Y 80/00* (2014.12); *C08K 2003/265* (2013.01); *C08K 2003/3045* (2013.01)

(56) References Cited

U.S. PATENT DOCUMENTS

| | | | |
|---|---|---|---|
| 9,527,242 B2 | 12/2016 | Rodgers et al. | |
| 2002/0113331 A1 | 8/2002 | Zhang et al. | |
| 2014/0141166 A1 | 5/2014 | Rodgers | |
| 2015/0080495 A1* | 3/2015 | Heikkila | B33Y 10/00 523/223 |
| 2015/0084222 A1 | 3/2015 | Heston et al. | |
| 2016/0024293 A1 | 1/2016 | Nestle et al. | |
| 2016/0122541 A1 | 5/2016 | Jaker et al. | |
| 2016/0185050 A1 | 6/2016 | Topolkaraev et al. | |
| 2016/0194492 A1 | 7/2016 | Smith, Jr. et al. | |
| 2016/0251486 A1 | 9/2016 | Cernohous et al. | |
| 2016/0368196 A1* | 12/2016 | Igarashi | C08L 23/04 |
| 2017/0008233 A1 | 1/2017 | Vontorcik, Jr. et al. | |
| 2017/0087774 A1 | 3/2017 | Pawloski et al. | |

* cited by examiner

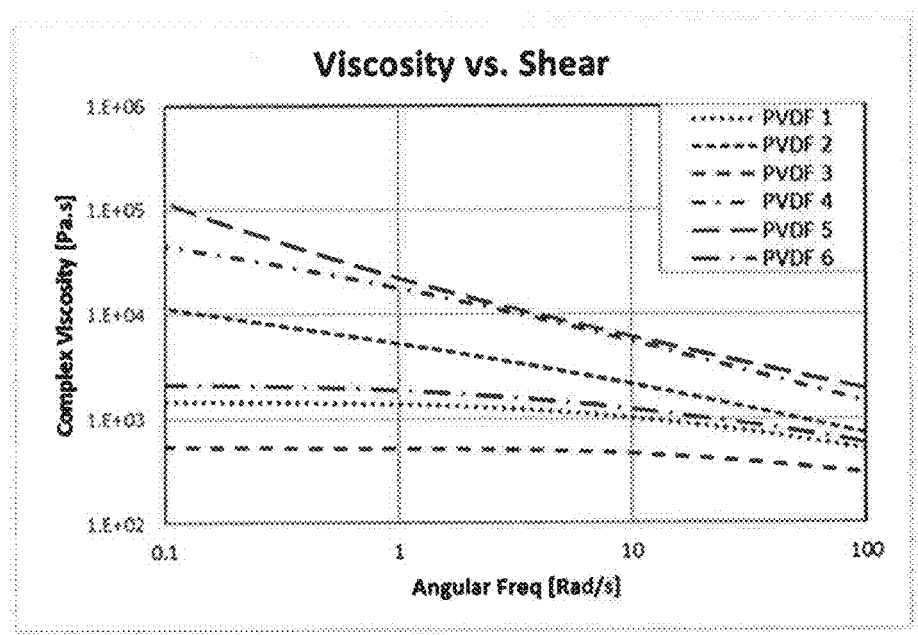
FIGURE 1
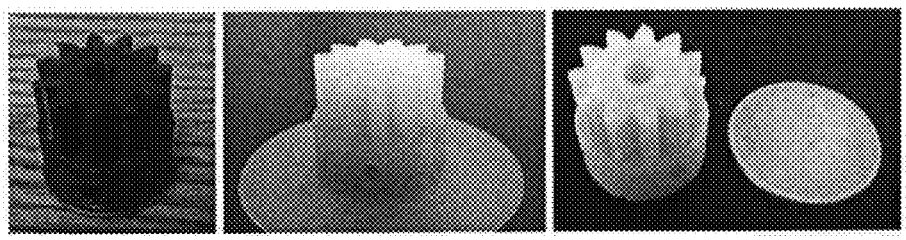
FIGURE 2: Picture of gears printed. Left is PVDF 5, mid is PVDF 1 and right is PVDF 2.

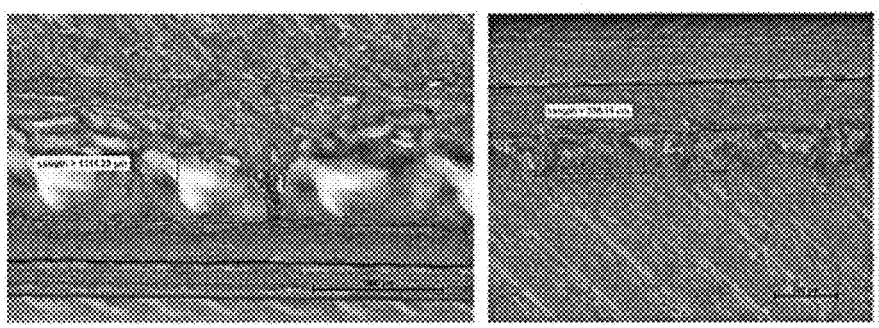
FIGURE 3: Left is of 105% flow, right is 120% flow.
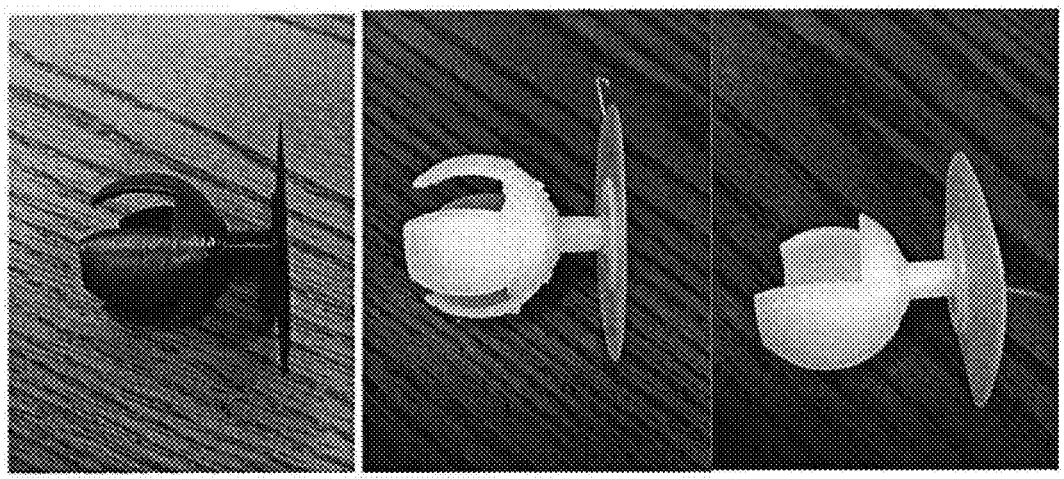
FIGURE 4: Left is PVDF 5, middle is PVDF 1, and right is Nylon 618.

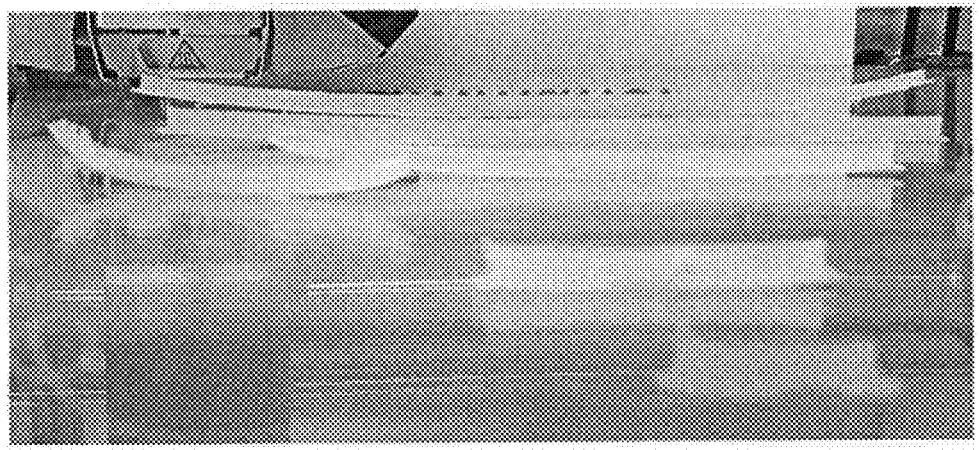
FIGURE 5: Warp test results for PVDF 4. It clearly warps off the base.
FIGURE 6: Warp test results for PVDF 8, showing little or no warping.
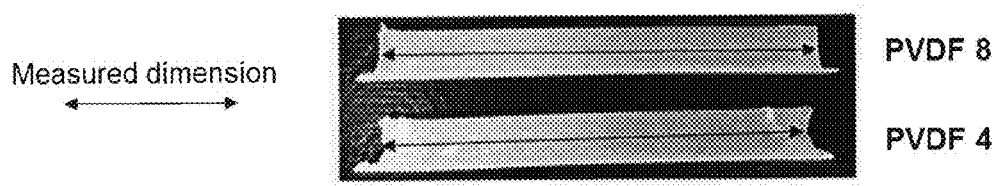
FIGURE 7: Shrinkage Test

3-D PRINTED FLUOROPOLYMER STRUCTURES

This application is a Continuation Application of copending U.S. Ser. No. 15/635,525 filed Jun. 28, 2017, and claims benefit, under U.S.C. § 119 or § 365 of PCT Application Number PCT/US17/25357, filed Mar. 31, 2017, U.S. Provisional Application No. 62/316,687, filed Apr. 1, 2016; and U.S. Provisional Application No. 62/320,649, filed Apr. 11, 2016, said applications incorporated herein by reference.

FIELD OF THE INVENTION

The invention relates to fluoropolymer filament for use in 3-D printing, and 3-D printed fluoropolymer articles having low warpage, excellent chemical resistance, excellent water resistance, flame resistance, and good mechanical integrity. Additionally, the articles of the invention have good shelf life without the need for special packaging. In particular, the invention relates to 3-D printed polyvinylidene fluoride (PVDF) articles, and in particular material extrusion 3-D printing. The articles may be formed from PVDF homopolymers, copolymers, and polymer blends with appropriately defined low shear melt viscosity. The PVDF may optionally be a filled PVDF formulation. The physical properties of the 3-D printed articles can be maximized and warpage minimized by optimizing processing parameters.

BACKGROUND OF THE INVENTION

Equipment advances and reduction in pricing have allowed 3D printing to become widely adopted in homes, schools, and industry as a fast, simpler, and often cheaper way to prototype and make custom end-use parts. Specifically, material extrusion 3D printing (also known as fused filament fabrication or fused deposition modeling), has emerged as a tool of choice for direct consumer use, larger scale production, and quick thermoplastic prototyping as it is the easiest to operate, produces the least waste, and provides the shortest turnaround time of conventional 3D printing technologies.

Many materials have been used to produce 3-D printed articles for a wide variety of end uses, from chocolate to collagen. Thermoplastic materials are especially well adapted for use with 3-D printers. Unfortunately, there have been few thermoplastics available that provide high chemical resistance, flame resistance, and good mechanical properties.

Some amorphous polymers like polyphenylsulfone (PPSU) have only a 3 percent elongation when printed. Nylons have higher elongation (~30%) but poor chemical resistance and must be dried prior to printing. Much higher elongation, flexible thermoplastic polyurethanes are available but have poor chemical resistance and weathering resistance.

Fluoropolymers are known for having excellent chemical resistance and good mechanical integrity. Most fluoropolymers, such as fluorinated ethylene propylene (FEP), perfluoroalkoxy alkane (PEA), ethylene tetrafluoroethylene (ETFE), ethylene chloro-trifluoro ethylene (ECTFE), perfluoromethyl alkoxy polymer (MFA) have narrow processing windows (between Tm and degradation temp) that make 3D printing difficult. In addition they have high shrinkage on transition from the melt to a final solid, making warpage a real issue.

Polyvinylidene fluoride (PVDF) is a semi-crystalline fluoropolymer that exhibits adhesion and warpage issues when 3-D printed. PVDF's semi-crystalline nature (PVDE homopolymer is known to have up to 50-65% crystallinity), and its high volume shrinkage during solidification (15-40%), lead to a high propensity to shrink and warp during filament 31) printing. PVDF's low surface energy of generally 25 to 31 dyne-cm results in poor adhesion to most materials.

Another issue facing fused deposition modeling printed plastics in general is that due to the layer by layer deposition process, the printed parts have significant mechanical anisotropy with properties measured in the z direction significantly lower than those measured in the xy direction. The xy directions are parallel to the bottom build stage, while the z direction is perpendicular to the build stage. The process typically involves the deposition of a layer in the xy direction followed by another layer in the xy direction. The z direction is built up by layers being deposited on top of each other. As a result printed functional parts do not perform as well in the z direction (such as a ball joint snap fit printed vertically, as shown in the Examples).

There is a need for processes and/or formulations allowing for acceptable 3-D printing of crystalline fluoropolymer articles. Fluoropolymer articles are desirable in 3-D printing for their chemical resistance, durability, flame resistance, and mechanical properties. Fluoropolymers such as PVDF that can be printed with little warpage and part shrinkage are highly desired. Such materials could be used in the industry for prototyping and custom end-use parts where high chemical resistance, durability, and part integrity are needed.

Surprisingly, after much research, a semi-crystalline fluoropolymer and process conditions have now been developed, that can be used in a filament 3-D printing process with good resistance to shrinkage and warpage. Additionally, the fluoropolymer or fluoropolymer formulation provides high chemical resistance, high water resistance, hydrophobicity, thermal and UV resistance, high layer to layer adhesion, good use temperature, good mechanical properties, high Relative Thermal Index (RTI) rating (130-150° C.), flame resistance, high elongation to break, and high impact, with the mechanical strength and stiffness that varies with the comonomer level in the PVDF, formulation components, filler type/level, and printing conditions. 3-D articles and parts printed from these formulations and using the methods of the invention could be stiff or flexible, with improved print resolution, and approach the strength and elongation to break of injection molded fluoropolymer parts. Filament made of the composition of the invention, due to its excellent moisture resistance, has a long shelf life of over a year, without any special moisture-resistant packaging.

Successful 3D printing of PVDF has been achieved by selection and adjustment of three parameters in the 3-D process, with excellent results achieved by combining two or all three parameters. The parameters include: polymer or polymer blend selection, optional filler selection, and specific processing conditions.

SUMMARY OF THE INVENTION

The invention relates to a fluoropolymer composition for use in 3-D printing, wherein said fluoropolymer composition comprises a fluoropolymer having a low shear rate viscosity of less than 13,000 Pa-s at its deposition temperature and 4 $sec^{-1}$, as measured by capillary rheometry. For a polyvinylidene fluoride polymer or copolymer, the melt viscosity measurement temperature is 232° C.

In one embodiment the fluoropolymer composition has a high shear rate viscosity of 30 to 2000 Pas at 232° C. and 100 sec$^{-1}$, as measured by capillary rheometry.

In one embodiment the fluoropolymer composition can be in the form of a filament or pellets. The composition can also contain from 0.01 to 50, preferably 0.1 to 40, and more preferably 1 to 30 weight percent of one or more fillers, based on the weight of the fluoropolymer and filler.

In one embodiment the fluoropolymer composition is a blend of the fluoropolymer and up to 49 weight percent of one or more other compatible, miscible, semi-compatible or semi-miscible polymers, which can be another fluoropolymer, a polymethyl methacrylate homopolymer or copolymer, or a block copolymer with one or more compatible blocks and at least one incompatible block.

In a preferred embodiment, the fluoropolymer is a PVDF homopolymer, or a PVDF copolymer having at least 50 weight percent of VDF monomer units, and from less than 50 weight percent to 0.001 weight percent of one or more comonomers selected from the group consisting of tetrafluoroethylene (TFE), trifluoroethylene (TrFE), chlorotrifluoroethylene (CTFE), dichlorodifluoroethylene, hexafluoropropene (HFP), vinyl fluoride (VF), hexafluoroisobutylene (HFIB), perfluorobutylethylene (PFBE), 1,2,3,3,3-pentafluoropropene, 3,3,3-trifluoro-1-propene, 2-trifluoromethyl-3,3,3-trifluoropropene, 2,3,3,3-tetrafluoropropene, 1-chloro-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

In one embodiment, the fluoropolymer is a multiphase filament having at least one polyvinylidene fluoride homopolymer or copolymer phase, and at least one phase of another polymer, where the total of the polyvinylidene fluoride homopolymer and copolymer phases makes up greater than 50 weight percent of said filament.

In one embodiment the filler is selected from the group consisting of carbon fiber, milled carbon fiber, carbon powder, carbon nanotubes, glass beads, glass fibers, nano-silica, Aramid fiber, polyaryl ether ketone particles or fibers, $BaSO_4$, talc, $CaCO_3$, graphene, nano-fibers, impact modifiers, and hollow spheres, and mixtures thereof.

The invention also relates to a process for forming a fluoropolymer article having low shrinkage and low warpage, using a 3D printer.

The invention also relates to three-dimensionally printed fluoropolymer articles having a tensile strength at yield of greater than 70% of the tensile strength at yield of a fluoropolymer of the same composition made by injection molding, and/or an elongation at break of greater than 50% of the elongation at break of a fluoropolymer of the same composition made by injection molding, and/or a stress at yield, of greater than 80% of the stress at yield of a fluoropolymer of the same composition made by injection molding.

BRIEF DESCRIPTION OF THE DRAWINGS

FIG. 1: Is a plot showing the angular shear behavior for several different PVDF samples.

FIG. 2: Pictures of gears printed by 3D printing using different PVDF materials. Left is PVDF 5, a carbon-filled PVDF, mid is PVDF 1, a PVDF polymer with a mid-range viscosity, and right is PVDF 2, a PVDF copolymer.

FIG. 3: Optical microscope images of PVDF 7 printed bars. Left is of 105% flow, right is 120% flow. Left had gap ~1.1 mm and right at 0.3 mm. The reduction in gap also correspond to increased part density and increased strength.

FIG. 4: Picture of printed snap-fit socket laid on its side. Left is PVDF 5, middle is PVDF 1, and right is Nylon 618. The Nylon 618 socket broke after one trial to fit in the ball. The PVDF 5 and PVDF 1 printed sockets survived multiple snap-fit tries. The PVDF 5 has print quality comparable to Nylon and other commercial materials.

FIG. 5: Shows parts form a comparative PVDF formulation after testing in the warpage test. There is clear warping off of the base.

FIG. 6: Shows parts form a PVDF formulation of the invention after testing in the warpage test. Little or no warping off of the base is seen.

FIG. 7: Show the results of a comparative formulation (PVDF4) and a formulation of the invention (PVDF8) in the shrinkage test.

DETAILED DESCRIPTION OF THE INVENTION

The invention relates to 3-D printed fluoropolymer articles, and in particular those made of polyvinylidene fluoride formulations, having low warpage, excellent chemical resistance, excellent water resistance, flame resistance, and good mechanical integrity. Good 3-D printable fluoropolymer formulations can be achieved by using select homopolymers or copolymers, selected formulations and fillers, selected process methods, and combinations of these factors. In general, the compositions, formulations, and processes of the invention reduce the level or effect of polymer crystallinity, which improves print properties.

"Copolymer" is used to mean a polymer having two or more different monomer units. "Polymer" is used to mean both homopolymer and copolymers. For example, as used herein, "PVDF" and "polyvinylidene fluoride" is used to connote both the homopolymer and copolymers, unless specifically noted otherwise. Polymers may be straight chain, branched, star, comb, block, or any other structure. The polymers may be homogeneous, heterogeneous, and may have a gradient distribution of co-monomer units. All references cited are incorporated herein by reference. As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble fraction molecular weight after extraction from gel is used.

"Low shear viscosity", as used herein is a measure of the melt viscosity (ASTM D3835-0) at a relatively low shear rate. This relates to the viscosity of the melt following printing. For purposes of this invention, the low shear rate at which viscosity is measured is at 4 sec$^{-1}$. The actual shear rate of the fluoropolymer following printing is essentially zero. "High shear viscosity" as used herein is a measure of the melt viscosity at a relatively high shear rate. This relates to the viscosity of the melt as it moves through the nozzle on a 3-D printer. The high shear rate viscosity is measured herein as the melt viscosity at a shear of 100 sec$^{-1}$. It is desirable that the viscosity of the melt under high shear is lower than the viscosity of the fluoropolymer melt under low shear, as can be seen in FIG. 1, due to shear thinning.

"ASTM temperature for Melt Flow Testing", as used herein is meant that the melt flow ranges of the fluoropolymers of the invention are tested at the temperature described in the corresponding ASTM method for the melt flow of that fluoropolymer. For example, for FEP this is ASTM D2116, for PFA it is ASTM D3307, for ETFE it is ASTM 3159, and for THV it is ASTM D1238, and for PVDF it is ASTM D3222. For blends and any polymers not having a listed ASTM temperature for Melt Flow Testing, 230° C. is used as the temperature for melt flow measurement.

Composition

Fluoropolymers useful in the invention include homopolymers or copolymers containing fluorinated monomers. The presence of fluorine on the polymer is known to impart enhanced chemical resistance, reduced coefficient of friction, high thermal stability, and enhancement of the material's triboelectricity. The term "fluoromonomer" or the expression "fluorinated monomer" means a polymerizable alkene which contains in its structure at least one fluorine atom, fluoroalkyl group, or fluoroalkoxy group whereby those groups are attached to the double bond of the alkene which undergoes polymerization. The term "fluoropolymer" means a polymer formed by the polymerization of at least one fluoromonomer, and it is inclusive of homopolymers and copolymers, and both thermoplastic and thermoset polymers. Thermoplastic polymers are capable of being formed into useful pieces by the application of heat and pressure, such as is done in 3-D printing. While thermoset fluoropolymers generally are not processed by 3-D printing, the precursors to, and oligomers of, the thermoset polymer could be printed, assuming the viscosity is adjusted to allow for a viscosity capable of being 3-D printed. Thickeners could be used to increase the viscosity of the pre-polymers, if needed, as known in the art. Conversely, plasticizers or diluents could be added to decrease the viscosity of the pre-polymers. Once the pre-polymers are 3-D printed together, they can then be cured (functionality reacted and cross-linked) using an appropriate energy source, such as heat, UV radiation, e-beam, or gamma radiation. One non-limiting example of a thermoset fluoropolymer would be the use of vinylidene fluoride and hexafluoropropene monomers with a fluoromonomer having bromide functionality. The brominated fluoropolymer could be 3-D printed, followed by radical cross-linking through the bromine functionality using a pre-added thermal radical source, or one that generates radicals upon application of light, UV, electron-beam, or gamma radiation.

The fluoropolymers may be synthesized by known means, including but not limited to bulk, solution, suspension, emulsion, and inverse emulsion processes. Free-radical polymerization, as known in the art, is generally used for the polymerization of fluoromonomers.

Fluoromonomers useful in the practice of the invention include, for example, vinylidene fluoride (VDF), tetrafluoroethylene (TFE), trifluoroethylene (TrFE), chlorotrifluoroethylene (CTFE), dichlorodifluoroethylene, hexafluoropropene (HFP), vinyl fluoride (VF), hexafluoroisobutylene (IAMB), perfluorobutylethylene (PFBE), 1,2,3,3,3-pentafluoropropene, 3,3,3-trifluoro-1-propene, 2-trifluoromethyl-3,3,3-trifluoropropene, 2,3,3,3-tetrafluoropropene, 1-chloro-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

Fluoropolymers useful in the practice of the present invention include the products of polymerization of the fluoromonomers listed above, for example, the homopolymer made by polymerizing vinylidene fluoride (VDF) by itself or the copolymer of VDF and HFP.

In one embodiment of the invention, it is preferred that all monomer units be fluoromonomers, however, copolymers of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, (meth)acrylic acid and salts therefrom, alpha-olefins of C4 to C16, butadiene, isoprene, vinyl esters, vinyl ethers, non-fluorine-containing halogenated ethylenes, vinyl pyridines, and N-vinyl linear and cyclic amides. In one embodiment, the fluoropolymer does not contain ethylene monomer units.

In a preferred embodiment, the fluoropolymer contains a majority by weight of vinylidene fluoride (VDF) monomer units, preferably at least 65 weight percent VDF monomer units, and more preferably at least 75 weight percent of VDF monomer units. Copolymers of VDF, and preferably copolymers of VDF and HFP, are especially preferred. The comonomer reducing the level of crystallinity of the copolymer.

Other useful fluoropolymers include, but are not limited to, polychlorotrifluoroethylene (CTFE), fluorinated ethylene vinyl ether (FENS), and (per)fluorinated ethylene-propylene (FEE).

Fluoropolymers and copolymers may be obtained using known methods of solution, emulsion, and suspension polymerization. In a preferred embodiment, the fluoropolymer is synthesized using emulsion polymerization whereby the emulsifying agent ("surfactant") is either perfluorinated, fluorinated, or non-fluorinated. In one embodiment, a fluorocopolymer is formed using a fluorosurfactant-free emulsion process. Examples of non-fluorinated (fluorosurfactant-free) surfactants are described in U.S. Pat. Nos. 8,080,621, 8,124,699, 8,158,734, and 8,338,518 all herein incorporated by reference. In the case of emulsion polymerization utilizing a fluorinated or perfluorinated surfactant, some specific, but not limiting examples are the salts of the acids described in U.S. Pat. No. 2,559,752 of the formula $X(CF_2)_n$—COOM, wherein X is hydrogen or fluorine, M is an alkali metal, ammonium, substituted ammonium (e. g., alkylamine of 1 to 4 carbon atoms), or quaternary ammonium ion, and n is an integer from 6 to 20; sulfuric acid esters of polyfluoroalkanols of the formula $X(CF—)_2—CH_2—OSO_3$-M, where X and M are as above; and salts of the acids of the formula $CF_3—(CF_2)_n—(CX_2)_m—SO3M$, where X and M are as above, n is an integer from 3 to 7, and m is an integer from 0 to 2, such as in potassium perfluorooctyl sulfonate. The use of a microemulsion of perfluorinated polyether carboxylate in combination with neutral perfluoropolyether in vinylidene fluoride polymerization can be found in EPO816397A1. The surfactant charge is from 0.05% to 2% by weight on the total monomer weight used, and most preferably the surfactant charge is from 0.1% to 0.2% by weight.

The fluoropolymer of the invention can be defined by the low shear and high shear viscosity of the fluoropolymer at the temperature defined for each fluoropolymer by the ASTM Melt flow Rate Testing Method. Preferably, the fluoropolymers of the invention have a low shear rate viscosity as measured at 4 sec$^{-1}$ of less than 13,000 Pa-s. by capillary rheometry according to ASTM D3835, and more preferably of less than 6,000 Pa-s at the temperature of melt deposition. Preferably the low shear viscosity is greater than 250 Pa-s, more preferably greater than 600 Pa-s, and more preferably greater than 1,000 pa-s. If the low shear viscosity is less than this, it is likely not to have a sufficient melt strength for the production of filament. While not being bound by any particular theory, this low-shear viscosity range seems to allow the printed polymer to stay where it is placed, and yet still be fluid enough for good interlayer adhesion and fusion. Higher low shear viscosity PVDF resulted in a higher level of warpage and shrinkage. Preferably the thermoplastic material has a high shear viscosity of 30 to 2000 Pa-s, preferably 100 to 1700 Pa-s, more preferably 300 Pas to 1200 Pa-s, at the temperature of melt deposition and 100 sec$^{-1}$. The key viscosity behavior is a combination of both the viscosity of the material coming out of the nozzle, and how fluid the material stays at the thermoplastic solidifies and crystallization occurs. In the case of a polyvinylidene fluoride polymer or copolymer, the above melt viscosity ranges are met when measured at 232° C.

Preferably the fluoropolymer or copolymer of the invention is semi-crystalline. While an amorphous polymer could work under the conditions described above, and not being bound to any particular theory, it is believed that some level of crystallinity is useful for 3D printing as it improves interlayer adhesion, and there is a period of time during the crystallization phase change for more chain entanglement between adjacent layers.

In one embodiment, the fluoropolymer of the invention could contain reactive functional groups, either by using a functional monomer, or by a post-treatment. Once the functional polymer is processed into a useful article, it could then be reacted or cross-linked, such as by UV radiation, or e-beam, for increased integrity. Cross-linking is known in the art to generally increase the tensile and flexural moduli, and reduce solubility and permeability of the cross-linked material, all of which could be advantageous physical property enhancements depending on the material's final application.

Blends of two or more different fluoropolymers are contemplated by the invention, as well as blends of two or more fluoropolymers having the same or similar monomer/ comonomer composition, but different molecular weights.

Blends are also contemplated between fluoropolymer and compatible or miscible non-fluoropolymers. In one embodiment, at least 50 weight percent, more preferably at least 60 weight percent, and more preferably at least 70 weight percent of PVDF with a polymethlmethacrylate (PMMA) homopolymer or copolymer. The PMMA copolymer of the alloy contains at least 50 weight percent, and more preferably at least 75 weight percent of methylmethacrylate monomers units. The melt miscible blend of PVDF with PMMA provides a surprising number of benefits including to reduce and control warpage, improve optical transparency when this is desirable, reduce shrinkage, improve base adhesion, improve layer to layer adhesion, and improve z direction mechanical properties. In addition the overall print quality is surprisingly improved. Low and very low viscosity compatible or miscible non-fluoropolymers can also be used for improved printability.

The compatible non-fluoropolymer could be a block copolymer containing at least one miscible block. The immiscible block could confer other properties like enhanced impact, ductility, optical properties, and adhesive properties. Either block could contain functional groups. In one embodiment, poly(meth)acrylate homo- and co-polymer blocks could be used as the compatible block in the block copolymer.

Blends of the fluoropolymer with other fluoropolymers or non fluoropolymers can be accomplished by any practical means including physical blending of the different polymers as dry ingredients, in latex form, or in the melt. In one embodiment, filaments of two or more polymers are coextruded in a core-sheath, islands in the sea, or other physical structure.

Blends of very low viscosity PVDF, homopolymer or copolymer, of 30 to 1000 Pas at 100 s$^{-1}$ and 232° C., can be blended with a higher viscosity PVDF to improve interlayer fusion/adhesion. The overall blend will have an average melt viscosity within the range of the invention.

For example, it was found that blending a low viscosity PMMA polymer to a homopolymer PVDF improved its base adhesion, base warpage, shrinkage, and overall printability. Surprisingly, even a small amount ~5% of PMMA polymer or copolymer added to the PVDF composition yielded a noticeable improvement in base warpage and a 28% reduction in shrinkage and a ~10% PMMA addition yielded further improvements in base warpage and a 37% reduction in shrinkage.

Similarly, adding a small amount (~10%) of very low viscosity PVDF copolymer also resulted in improved base adhesion and a 16% reduction in shrinkage even as the part became more elastomeric.

Throughout this application, PVDF and its blends and copolymers will be used as an exemplary fluoropolymer. It is understood that one skilled in the art will understand that other fluoropolymers can be manipulated in a similar manner to provide similar benefits in 3-D printing.

Fillers

A second means found to provide good fluoropolymer filament for the production of 3-D printed articles involves the use of fillers blended with the fluoropolymer. While not being bound by any particular theory, it is believed that fillers serve to modify the crystallinity of the polymer matrix. Lower crystallinity in the filled fluoropolymer blend composition leads to lower shrinkage. The melt to solid volume change is also reduced by the use of fillers, further reducing shrinkage. In addition, fillers can improve tensile modulus to further reduce warpage and shrinkage.

Fillers can be added to a fluoropolymer by any practical means. Twin-screw melt compounding is one common method whereby fillers can be uniformly distributed into a fluoropolymer and the filled composition pelletized. Fillers could also be dispersed into a fluoropolymer emulsion., with the blend being co-spray-dried, for a more intimate blend of the materials.

In one embodiment, the filler can be compounded into a PVDF-miscible polymer (such as PMMA), and the filled miscible polymer then added to the PVDF.

It was surprisingly found that when a PVDF homopolymer of the low shear melt viscosity described above, was blended with about 20 weight percent of carbon powder, based on the volume of the PVDF/carbon blend, the 3-D printed parts produced had low warpage and shrinkage—and the print quality compares very well with commercially available 3D printing filaments. This filled sample showed better 3D printing quality, including higher definition, than the unfilled homopolymer.

Surprisingly, the mechanical performance of 3D printed parts made with both filled and non-filled fluoropolymer of the invention had enough integrity to produce strong snap fit components, while parts made of commercial polyamide filament cracked when fabricated into similar snap fit articles. For example, for a ball-joint snap fit part printed in the vertical direction, one printed from a commercial polyamide filament broke along the xy direction (z direction failure), whereas the parts printed from carbon filled PVDF homopolymer filament did not. One could expect that a filled material would show a decrease in layer-to-layer adhesion, but no decrease of layer-to-layer adhesion was seen in the carbon powder-filled PVDF.

Fillers can be added to the fluoropolymer at an effective level of from 0.01 to 50 weight percent, preferably 0.1 to 40 and more preferably from 1 to 30 volume percent, based on the total volume of the fluoropolymer and filler. The fillers can be in the form of powders, platelets, beads, and particles. Smaller materials, with low aspect ratios are preferred, to avoid possible fouling of the nozzle. Useful fillers for the invention include, but are not limited to carbon fiber, carbon powder, milled carbon fiber, carbon nanotubes, glass beads, glass fibers, nano-silica, Aramid fiber, PVDF fiber, polyaryl-ether ketone fibers, $BaSO_4$, talc, $CaCO_3$, graphene, nano-fibers (generally having an average fiber length of from 100 to 150 nanometers), and hollow glass or ceramic spheres. One could envision the use of particles with an aspect ratio designed to improve mechanical strength as another alternative to the particulate filler tested so far.

The addition of fillers was found to raise the melt viscosity of PVDF, however, provided that the PVDF composition as a whole was within the specified melt viscosity parameters, the PVDF composition was printable. The addition of filler increased print quality and decreased warpage.

It is expected that the fillers, and especially fibers, can provide excellent shrinkage reduction. One issue with fibers is that they tend to increase the viscosity of the melt, and could clog nozzles. This effect could be minimized by using a lower melt viscosity fluoropolymer, a short aspect ratio fiber, or a larger nozzle size.

Other common additives may also be added to the fluoropolymer composition in effective amounts, such as, but not limited to adhesion promoters and plasticizers.

Process

The polymer or filled polymer formulation is formed into a filament, pellets, generally by an extrusion process, or is in the form of a powder, such as from an emulsion process. Surprisingly the PVDF filament of the invention has a high, consistent bulk density, and little or no voids. Preferably less than 5 volume percent, preferably less than 2 volume percent, more preferably less than 1 volume percent, more preferably less than 0.5 volume percent, and most preferably less than 0.1 volume percent of voids are present in the filament. The level of voids is dependent on many factors, such as the molecular weight, homopolymer or copolymer composition, filler and compatible polymer percentage. Filament consistency is important, and filament is generally fed to the printer based on length of the filament.

Filament made of the composition of the invention can take several forms. The filament could be mono-phase, or multi-phase. A multi-phase filament could be formed with 2 or more concentric layers, to provide a good blend of properties. In one embodiment, an amorphous polymer forms the outside layer, with one or more crystalline or semi-crystalline polymers on the inside. In another embodiment, an inner and outer layer could have different levels of filler, compatible polymers, or both. In still another embodiment, and islands-in-the-sea morphology could be produced.

The compositions or resins will be 3D printed in a material extrusion (fused deposition modeling, fused filament fabrication) style 3D printer with or without filaments (any size diameter, including 1.75 mm, 2.85 mm or other sizes) and with any sized nozzle at any speed that can use filament, pellets, powder or other forms of the fluoropolymer raw material. The 3-D printing of this invention is not a laser sintering process. The fluoropolymer compositions could be made into filaments for such purposes. They could potentially be even sprayed-nuzzled onto the surface (sprayed melted plastic) to be printed, such as by Arburg Freeformer technology.

A general description of the printing process would involve the following steps: Feeding the fluoropolymer filament, pellets or powder into the 3D printer. The computer controls of the printer will be set to provide a set volume flow of material, and to space the printed lines at a certain spacing. The machine will feed the fluoropolymer composition to a heated nozzle at the set speed, the printer moving the nozzle into the proper position for depositing set amount of fluoropolymer composition.

In a preferred embodiment, the polymer has a low shear melt viscosity as described above. The printer would generally have a heated bed of 50-150° C. (preferably above 90"C).

In one preferred embodiment, the 3-D printer is programmed to operate at a 105 to 150% overflow. This means that the volume of fluoropolymer composition fed by the printer is higher than the calculated volume required for the 3-D article being formed. The overflow packs the fluoropolymer closer together, helps to compensate for some shrinkage, while increasing the strength and mechanical properties of the printed article. The overflow can be set by two different Means. In the first method, the software is set to feed a higher percent of material into the nozzle than would be normally needed. In the second method, the software would be set to decrease the spacing between lines, and thus create an overlap in the lines, resulting in extra material being printed into the article.

Process parameters of the 3-D printer can be adjusted to minimize shrinkage and warpage, and to produce 3-D printed parts having optimum strength and elongation. The use of selected process parameters applies to any extrusion/melt 3D printer, and preferably to filament printing.

One added advantage of PVDF over other materials is that it is hydrophobic, which means there is no need to dry the filaments before printing, as with some polyamides and other materials, and no changes occur in the filament during storage due to the hydrophobicity, UV stability, and chemical resistance. The filaments can be used as is in all environments.

In one embodiment, two or more nozzles, using two or more different compositions could be utilized to produce novel, larger, and less warping articles. One use would be to produce a less warping, rigid, better base adhering compatible or miscible material as the base, then printing the lesser adhering, higher shrinking desired material on top. A variant would be to use an acrylic base composition, followed by a fluoropolymer composition on top.

Another variant utilizing just one nozzle, would be to place a compatible acrylic film on the heated bed as the base and then print the desired fluoropolymer composition on top.

A unique embodiment of the invention, not possible in an injection molded part, is the formation of a mechanically asymmetric part made using a rigid and a flexible fluoropolymer whereby one direction (x) would be rigid and the other direction (y) would be flexible. This could be made by printing alternating bands of rigid and flexible material in one direction and only flexible in the other, perpendicular direction. The resulting mechanical properties, flex modulus and tensile modulus, of the part in one direction would be different than that in the other direction, making this part mechanically asymmetric. This design would be enabled by the fluoropolymer's compatibility with each other even across a wide range of rigidity.

Properties

3-D articles produced from the polymer formulation, and under the proper 3D printing conditions result in part flexibility and in some cases extremely high elongation at break. In one embodiment, a surprising high strain to break was observed (~700% compared to ~6% for ABS and PLA and ~30% for a polyamide) when printed and tested in the xy direction, parallel to the build plate, while matching strain and stress to break for an injection molded part of a similar composition. Other formulations showed excellent strain to break after 3D printing (70% elongation) compared to polymers commonly used, again in the xy direction. In another embodiment, an article formed from the polymer formulation of the invention showed greater than 50 percent, preferably over 60 percent, and in some cases even over 80 percent of the elongation at break of a fluoropolymer part of the same composition made by injection molding when printed and tested in the xy direction while maintaining over 75%, preferably over 85%, and in some cases over 95% of the stress at yield of the fluoropolymer part of the same composition made by injection molding. By combining all aspects of the invention together—the selection of the proper viscosity, with the printing techniques and with the use of fillers or polymer blends in the PVDF, even higher quality PVDF parts could be produced than with the pure polymer alone.

In one embodiment it was found that the 3-D printed fluoropolymer article had similar elongation and yield strength when printed and tested in the xy direction as an injection molded article of the same composition. These properties are unexpected for a 3-D printed fluoropolymer article, and indeed for any 3-D printed article of any polymer chemistry or formulation.

In a preferred embodiment, an article was obtained having both greater than 700% elongation at break and also greater than 1500 psi stress at yield when printed and tested in the xy direction. In another embodiment, an article was obtained having greater than 70% strain at break and also greater than 3500 psi stress at yield when printed and tested in the xy direction. In still another embodiment, an article was obtained having greater than 35% elongation at break and also greater than 6500 psi stress at yield when printed and tested in the xy direction. The elongation at break, strain at break, mid stress at yield seen in the xy direction with the composition of the invention are some of the highest available for any polymer chemistry or formulation currently available.

In another embodiment, it was surprisingly found that an article with even small amount ~5% of PMMA polymer or copolymer added to the PVDF composition, yielded improved layer adhesion and a 70% improvement in the elongation at break of the article when printed and tested in the z direction, while maintaining similar stress at yield. A 10% PMMA addition yielded further improved layer adhesion and a 110% improvement in the elongation at break of the article when printed and tested in the z direction while still maintaining similar stress at yield.

Filament of the invention has excellent shelf life. The high moisture resistant fluoropolymer composition filament can be stored for month and even years, with little or no moisture pick-up. No special moisture-resistant packaging is required, as is needed with other resins typically used in 3-D printing like polylactic acid, and polyamides. The filament, and also articles formed from the filament of the invention will absorb less than 0.05% water, when placed in room temperature water for 24 hours, Adsorbed moisture in a filament leads to poor quality prints.

Uses

The present invention provides the first non-hydgroscopic crystalline product for use in filament production and 3D printing for an engineering fluoropolymer resin.

3-D printed parts and articles are especially useful for articles to be used in harsh environments, in which chemical resistance, moisture resistance, UV resistance, flame resistance, and good mechanical integrity is required. The use of the parts or articles made with the composition and process of the invention are especially useful in chemical handling equipment, or for making parts to be exposed to chemical contact.

3-D printed fluoropolymer parts of the invention could find use in solar panels, aircraft, and transportation, as well as other high performance applications. The 3-D printed parts have similar strength and elongation compared to an injection molded part, and with the precision and detail that can be obtained in a 3-D printing process. In addition, the 3-D printed parts of the invention display superior combined mechanical property performances (stress at yield and elongation at break) compared to currently available 3-D printed parts, such as those of polyamides, ABS and polylactic acid.

EXAMPLES

Materials:

PDVF 1: A PVDF homopolymer adhering to ASTM D3222 Type I, Grade 2, Low Viscosity.

PVDF 2: A PVDF copolymer with a heterogeneous comonomer distribution in the backbone chain containing 7-12% HFP by weight as a comonomer and a melting point of 160-168° C.

PVDF 3: A PVDF homopolymer adhering to ASTM D3222 Type I, Grade 2, Low Viscosity.

PVDF 4 (comparative): A PVDF homopolymer having a high molecular weight, and a melt viscosity at 232° C. of greater than 10,000 Pa-s.

PVDF 5: A PVDF homopolymer with carbon filler at 15-25%.

PVDF 6: A PVDF random copolymer with a melting point of 155-160° C.

PVDF 7: A PVDF random copolymer with a melting point between 130 and 138° C.

PVDF 8: A PVDF blend with PVDF homopolymer of low viscosity (PVDF 1) with a low viscosity PMMA added at 3-7 wt %.

PVDF 9: A PVDF blend with PVDF homopolymer of low viscosity (PVDF 1) with a low viscosity PMMA added at 8-12 wt %.

PVDF 10: A PVDF blend with PVDF homopolymer of low viscosity (PVDF 1) with a high flow PVDF random copolymer added at 9-12 wt %.

Warpage Test

A simple test was created to measure and compare base warpage of various materials on the 3D printing build plate (base warpage being critical in that if a part does not adhere to the base then the part cannot be printed). A test to measure the shrinkage of the material can also be derived from this test.

The test involved printing thin lines/walls (of 0.8 mm thick, two paths of the nozzle) of various lengths of different materials on a heated glass plate (110 C) and looking to see which materials and at what lengths the parts warped/came off the plate. The lengths tested were from 2 cm to 20 cm and a height of about 1 cm, with 3 lines of brim and using polyvinyl acetate glue solution as mentioned in example 2.

Each print was then evaluated from the edges as either showing no warpage, occasional warpage (some prints warping other times not), small warpage (any detachment from the base), medium warpage (a couple mm from the base), large warpage (>0.5 mm from the base), could not print (part came off the base before it finished printing). The results are shown in Table 1. It was found that HFP-rich copolymers adhered better to the base than PVDF homopolymers. As shown in FIG. 5, the PVDF 4 (comparative) samples warp off of the base; while the PVDF 8 samples of the invention shown in FIG. 6 show little or no warpage.

Shrinkage Test:

A 4 cm long, thin line/wall (of 0.8 mm thick, two paths of the nozzle) was printed on a heated glass plate (110 C) with 3 brims around the sample to guarantee that the sample stays on the base. After printing, the distance edge to edge of the print at the most narrow was measured and compare to the theoretical value (4.0 cm). This gives a % shrinkage and can relatively quantitatively compare the shrinkage across materials.

One can see the effect of viscosity and effect of blending with low viscosity grade. From PVDF 4, to PVDF 1, to PVDF 3, dropping in low shear viscosity, and also dropping in shrinkage. The introduction of compatible low viscosity blend, provides an additional drop in shrinkage. From PVDF 1, to PVDF 8, to PVDF 9. As seen in FIG. 7.

Example 1

A series of different PVDF formulations was evaluated for angular shear behavior. The shear results are shown in FIG. 1.

Example 2

Filaments were produced using a Davis-Standard tubing line, following similar procedures and set up as when they make welding rods (3 or 4 mm) rods—extruder, air/water cooler, and puller. These were produced on a Davis Standard 1.5 inch extruder with a 24:1 L|D with temperature set points at 350 F in the extruder, 335 F on the die and a line speed of 16 to 18 fpm with the strand air cooled and fed into a 2 belt puller to control the line speed.

The filaments were 3D printed on an Ultimaker 2 desktop fused deposition modeling (fused filament fabrication, material extrusion) machine. The design was manipulated and sliced by Cura, a standard 3D software provided by Ultimaker. All ten of the PVDF samples produced filaments and produced surprisingly good print quality articles with surprising mechanical results (the one PVDF 4 with higher low shear viscosity than 10,000 Pa-s being one showing large base warpage).

The mechanical test parts are printed solid with 0.8 mm walls, and diagonal (45°) crisscross in-fill and 0.2 mm/layer thickness and nozzle diam. of 0.4 mm. Other sample parts are printed with various infill %, but also with 0.8 mm walls, diagonal (45°) crisscross in-fill and 0.2 mm/layer thickness and nozzle diam. of 0.4 mm. Various % overflow (from 0-20%) were also tested, being utilized to counter shrinkage. Generally mechanical properties increased with increasing % overflow up to ~15-20% with the exact optimal overflow % depending on material/print parameters. Thus a 15-25% overflow is best for functional parts. For prototype parts a 5-10% overflow could be used to get better print finish.

The temperature of the nozzle was set at 260° C., build plate heated to 110° C., print speed was 20 mm/s with 20% overflow, fan speed at 50%. A thin layer of polyvinyl acetate glue solution was used to help adhesion and for homopolymer PVDF filament a brim on the print was necessary. The build plate is glass. Copolymers, while having a lower surface energy have the surprising effect of having improved adhesion to the build plate. Improved adhesion of the first layer to the build plate is a key factor in reducing warpage. The resulting printed parts are shown in FIG. 2.

Example 3: Printed Parts Mechanical Properties

Type IV tensile bars were printed in the XX direction (lying flat on the build plate) to test xy tensile properties. Optical images microscopy images were taken of PVDF 7 tensile bars with increasing % overflow (from 5% to 20%). The results, optical and mechanical, show best fill and properties with 20% overflow. Less shrinking resins would need less overflow. PVDF 5 for example needs only 10% overflow to reach optimal properties and minimal gaps found on side walls. The optical microscopy images are shown in FIG. 3.

Example 4

Mechanical results are listed below in Table 1 for the different Samples. Printed PVDF 7 has extremely high elongation (~700%) for an engineering material by 3D printing, and has an elongation and strength matching that of injection molded parts—which is extremely surprising in 3D printing, and not known to be reported as of this writing for a fluoropolymer or other 3D filament printing. PVDF 2 shows a drop in elongation of 3D printed part versus injection molded part (elongation is still high for 31) parts), but maintains ~100% of the injection molded tensile strength and compares very favorably to parts made with commercial nylons (4600 psi stress at yield and 30% elongation), PVDF 6 has the greatest tensile strength for the copolymer samples, with elongation as good as nylons (~30%) but lower than other copolymers of this invention. Printed PVDF 1 has great balance of properties and under optimal printing conditions the tensile strength and elongation to break are 80-90% of that for an injection molded bar of PVDF 1. The overall mechanical strength of this grade is outstanding. Printed PVDF 5 which had very good printability and elongation similar to injection molded PVDF, but only 60% of its stress at yield.

TABLE 1

| Materials of interest | % Overflow | Printed Strain at Break (%) in XY | Inject mold Strain at Break (%) | Printed Stress at Yield [psi] in XY | Inject Mold Stress at Yield [psi] |
| --- | --- | --- | --- | --- | --- |
| PVDF 7 | 15-25 | 733 | 670 | 1700 | 2100 |
| PVDF 2 | 20 | 72 | 530 | 4000 | 3850 |
| PVDF 6 | 15 | 29.9 | 200 | 5400 | 5300 |
| PVDF 1 | 15-20 | 41 | 60? | 7000 | 7500 |
| PVDF 5 | 20 | 22 | 20 | 4150 | 4770 |
| PVDF 5 | 10 | 22.5 | " | 4350 | " |
| PVDF 5 | 0 | 5.7 | " | 4050 | " |
| Nylon | — | 30 | | 4600 | |

TABLE 1-continued

| Materials of interest | % Overflow | Printed Strain at Break (%) in XY | Inject mold Strain at Break (%) | Printed Stress at Yield [psi] in XY | Inject Mold Stress at Yield [psi] |
|---|---|---|---|---|---|
| ABS | 5 | 5.9 | 20-30 | 4900 | 4940-7420 |
| PLA | 5 | 6 | 10 | 7500 | 8840-9500 psi |

Example 5: Shrinkage

Shrinkage was measured on several Samples, using the shrinkage test described above. The results are found in Table 2:

TABLE 2

| MATERIAL | length (mm) | % shrinkage |
|---|---|---|
| PVDF 3 | 38.60 | 3.5% |
| PVDF 1 | 38.29 | 4.3% |
| PVDF 4 | 37.62 | 6% |
| PVDF 9 | 38.92 | 2.7% |
| PVDF 8 | 38.75 | 3.1% |
| PVDF 10 | 38.58 | 3.6% |

Example 6: Z Direction Properties

Type 5BA ISO 527 tensile bars were printed in the Z direction (perpendicular to the build plate) to test Z direction tensile properties and layer to layer adhesion. The parts are printed solid with 0.8 mm walls, and diagonal (45°) criss-cross in-fill and 0.2 mm/layer thickness and nozzle diam. of 0.4 mm. Z direction mechanical results are listed below in Table 3, for the different samples. PVDF 8 and 9, which have some low viscosity PMMA blend into PVDF 1, show significant increase in Z direction strain at break. With increasing yet still small content of the compatible acrylate (3-7% and 8-12%), the Z direction strain at break increases 70% and 110% respectively. PVDF 8 and 9 demonstrate superior Z direction strain at break for a rigid material compared with other materials tested and commercially available materials with similar XY direction mechanical properties as PVDF 1.

TABLE 3

| Name/Material | 3D printed Z stress at yield (psi) | 3D printed Z strain at Break (%) |
|---|---|---|
| PVDF 1 | 5500 | 5.1 |
| PVDF 8 | 5600 | 8.9 |
| PVDF 9 | 5500 | 10.9 |
| PLA Commercial | 5500 | 1.4 |
| Nylon, Stratasys | 4100 | 5.4 |

Example 7

Generally PVDF homopolymers and PVDF copolymers defined in this invention yield parts that have very good interlayer strength when processed according to this invention, which means properties closer to that of injection molded products while retaining the outstanding chemical and flame resistance inherent in PVDF polymers. It also means better layer to layer adhesion and better overall part performance.

A ball and socket model was printed out of Taulman 618 (a nylon copolymer), PVDF 1, PVDF 5, and an acrylate using stereo lithography 3D printing (SLA) (FIG. 4). It was printed with 20% infill at 25 mm/s. Only the PVDF 1 and PVDF 5 ball and sockets could snap on and off even though their parts don't appear as nice. The sockets made from other materials broke upon inserting the ball. The Nylon 618 socket broke after one trial to fit in the ball. The PVDF 5 and PVDF 1 printed sockets survived multiple snap-fit tries. The PVDF 5 has print quality comparable to Nylon and other commercial materials, but the PVDF 1 is lacking by comparison.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A fluoropolymer composition for use in 3-D printing, wherein said fluoropolymer composition comprises a fluoropolymer having a low shear rate viscosity of less than 13,000 Pa-s at the temperature given in the ASTM Melt Flow Testing for that fluoropolymer, and 4 sec$^{-1}$, as measured by capillary rheometry.

2. The fluoropolymer composition for use in 3-D printing of aspect 1, wherein said fluoropolymer composition comprises a homopolymer of vinylidene fluoride, or a copolymer comprising at least 65 weight percent of vinylidene fluoride monomer units, and one or more comonomers, having said low shear rate viscosity at 232° C. and 4 sec of less than 13,000 Pa-s, as measured by capillary rheometry.

3. The fluoropolymer composition of any of aspects 1 or 2, wherein said fluoropolymer has a high shear rate viscosity of 30 to 2000 Pa-s at 232° C. and 100 sec$^{-1}$, as measured by capillary rheometry at the temperature given in the ASTM Melt Flow Testing for that fluoropolymer.

4. The fluoropolymer composition of any of aspects 1 to 3, wherein said fluoropolymer composition is in the form of a filament or pellets.

5. The fluoropolymer composition of any of aspects 1 to 4, wherein said fluoropolymer composition further comprises from 0.01 to 50, preferably 0.1 to 40, and more preferably 1 to 30 weight percent of one or more fillers, based on the weight of the fluoropolymer and filler.

6. The fluoropolymer composition of any of aspects 1 to 5, wherein said fluoropolymer composition comprises a blend of said fluoropolymer and up to 49 weight percent of one or more other compatible polymers.

7. The fluoropolymer composition of any of aspects 1 to 6, wherein said other compatible polymer is selected from a different fluoropolymer, a polymethyl methacrylate homopolymer or copolymer, or a block copolymer with one or more compatible blocks and at least one incompatible block.

8. The fluoropolymer composition of aspect 4, wherein said fluoropolymer filament is a coextruded, multiphase filament having at least one polyvinylidene fluoride homopolymer or copolymer phase, and at least one phase of another polymer, copolymer or blend, and wherein the total of all polyvinylidene fluoride homopolymer and copolymer phases makes up greater than 50 weight percent of said filament.

9. The fluoropolymer composition of any of aspects 4 or 5, wherein said filament contains less than 5 volume percent of void space, preferably less than 1 volume percent, and most preferably less than 0.5 volume percent.

10. The fluoropolymer composition of any of aspects 4 to 6, Wherein said filler is selected from the group consisting of carbon fiber, milled carbon fiber, carbon powder, carbon nanotubes, glass beads, glass fibers, nano-silica, Aramid fiber, polyaryl ether ketone fibers, $BaSO_4$, talc, $CaCO_3$, graphene, impact modifiers, nano-fibers, and hollow spheres, and mixtures thereof.

11. The fluoropolymer composition of aspect 6, wherein blend comprises at least two chemically different fluoropolymers, and/or fluoropolymers of differing weight average molecular weights wherein said weight average viscosity of the blend is <113000 Pa-s.

12. The fluoropolymer composition of any of aspects 1 to 11, wherein said fluoropolymer is a. homopolymer, or a PVDF copolymer having at least 50 weight percent of VDF monomer units, and from less than 50 weight percent to 0.001 weight percent of one or more comonomers selected from the group consisting of tetrafluoroethylene (TFE), trifluoroethylene (TrFE), chlorotrifluoroethylene (CTFE), dichlorodifluoroethylene, hexafluoropropene (HFP), vinyl fluoride (VF), hexafluoroisobutylene (HFIB), perfluorobutylethylene (PFBE), 1,2,3,3,3-pentafluoropropene, 3,3,3-trifluoro-1-propene, 2-trifluoromethyl-3,3,3-trifluoropropene, 2,3,3,3-tetrafluoropropene, 1-chloro-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

13. A process for forming a 3-dimensional fluoropolymer article, comprising the steps of:
    presetting the software of a 3D printer to a set volume flow and line spacing for the printing of said article;
    feeding the fluoropolymer composition of aspect 1 in the form of filament, pellets or powder into the 3D printer;
    feeding by the printer of the fluoropolymer composition melt to one or more heated nozzles,
    depositing the fluoropolymer composition melt at the set location, line spacing and flow rate set by the software, to form an article.

14. The process of aspect 13, wherein said flow rate and/or line spacing represents an overflow of from 105 to 150 volume percent 15. A three-dimensionally printed fluoropolymer article, formed of the fluoropolymer composition of any of aspects 1 to 12.

16. The three-dimensionally printed fluoropolymer article of aspect 15, wherein said article has a tensile strength at yield, of greater than 700% as measured in the xy direction.

17. The three-dimensionally printed fluoropolymer article of aspects 15 or 16, wherein said article has an elongation at break, of greater than 70 percent, and also greater than 1500 psi stress at yield when printed and tested in the xy direction.

18. The three-dimensionally printed fluoropolymer article of any of aspects 15 to 17, wherein said article has a strain at break of greater than 70 percent, and also greater than 3500 psi stress at yield when printed and tested in the xy direction.

19. The three-dimensionally printed fluoropolymer article of any of aspects 15 to 18, having a base material and on or more different compatible polymer compositions on top of the base layer, wherein said base layer is less warping and has better adhesion to the support than the compatible polymer layer on top of the base layer 20. The three-dimensionally printed fluoropolymer article of any of aspects 15 to 19, wherein two or more fluoropolymers compositions with different stress modulus, and two or more nozzles are used, producing a mechanically asymmetric part made using a rigid and a flexible fluoropolymer whereby one direction (x) is rigid and the other direction (y) is flexible.

21. The three-dimensionally printed fluoropolymer article of any of aspects 15 to 20, wherein said article is cross-linked after printing by radiation.

What is claimed is:

1. A three-dimensionally printed fluoropolymer article, comprising:
    a) a fluoropolymer composition, wherein the fluoropolymer in said fluoropolymer composition comprises either a homopolymer of vinylidene fluoride, or a copolymer comprising at least 65 weight percent of vinylidene fluoride monomer units, and up to 35 weight percent of one or more comonomers, and wherein said fluoropolymer has a low shear rate viscosity at 232° C. and 4 $sec^{-1}$ of less than 13,000 Pa-s, and a high shear rate viscosity of 30 to 2000 Pa-s at 232° C. and 100 $sec^{-1}$, as measured by capillary rheommetry at 232° C., and
    b) from 0.01 to 20 weight percent of fillers, wherein said fillers are selected from the group consisting of carbon fiber, milled carbon fiber, carbon powder, carbon nanotubes, glass beads, glass fibers, nano-silica, Aramid fiber, polyaryl ether ketone fibers, $BaSO_4$, talc, $CaCO_3$, graphene, impact modifiers, nano-fibers, and hollow spheres, and mixtures thereof.

2. The three-dimensionally printed fluoropolymer article of claim 1, wherein said article has a tensile strength at yield, of greater than 700% as measured in the xy direction.

3. The three-dimensionally printed fluoropolymer article of claim 1, wherein said article has an elongation at break, of greater than 70 percent, and also greater than 1500 psi stress at yield when printed and tested in the xy direction.

4. The three-dimensionally printed fluoropolymer article of claim 1, wherein said article has a strain at break of greater than 70 percent, and also greater than 3500 psi stress at yield when printed and tested in the xy direction.

5. The three-dimensionally printed fluoropolymer article of claim 1, further comprising a base material comprising a polymer compatible with said fluoropolymer composition, upon which said printed fluoropolymer article is directly attached, wherein said base layer is less warping and has better adhesion to a support than the compatible polymer layer on top of the base layer.

6. The three-dimensionally printed fluoropolymer article of claim 1, wherein two or more fluoropolymers compositions with different stress modulus, and two or more nozzles are used, producing a mechanically asymmetric part made using a rigid and a flexible fluoropolymer whereby one direction (x) is rigid and the other direction (y) is flexible.

7. The three-dimensionally printed fluoropolymer article of claim 1, wherein said article is cross-linked.

8. The three-dimensionally printed fluoropolymer article of claim 7, wherein said cross-links are formed after printing by radiation.

9. The fluoropolymer article of claim 1, wherein said fluoropolymer composition comprises a blend of said fluoropolymer and up to 49 weight percent of one or more other compatible polymers, wherein said other compatible polymer is selected from a different fluoropolymer, a polymethyl methacrylate homopolymer or copolymer, or a block copolymer with one or more compatible blocks and at least one incompatible block.

10. The fluoropolymer article of claim 9, wherein said blend comprises at least two chemically different fluoropolymers, and/or fluoropolymers of differing weight average molecular weights, wherein said weight average viscosity of the blend is <less than 13,000 Pa-s.

11. The fluoropolymer article of claim 1, wherein said one or more comonomers are selected from the group consisting of tetrafluoroethylene (TFE), trifluoroethylene (TrFE), chlorotrifluoroethylene (CTFE), dichlorodifluoroethylene, hexafluoropropene (HFP), vinyl fluoride (VF), hexafluoroisobutylene (HFIB), perfluorobutylethylene (PFBE), 1,2,3,3-pentafluoropropene, 3,3,3-trifluoro-1-propene, 2-trifluoromethyl-3,3,3-trifluoropropene, 2,3,3,3-tetrafluoropropene, 1-chloro-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

\* \* \* \* \*